United States Patent
Miura

(10) Patent No.: US 12,545,333 B2
(45) Date of Patent: Feb. 10, 2026

(54) REAR VEHICLE BODY STRUCTURE OF VEHICLE

(71) Applicant: SUBARU CORPORATION, Tokyo (JP)

(72) Inventor: Hikaru Miura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 406 days.

(21) Appl. No.: 18/374,247

(22) Filed: Sep. 28, 2023

(65) Prior Publication Data

US 2024/0124071 A1    Apr. 18, 2024

(30) Foreign Application Priority Data

Oct. 13, 2022   (JP) ................................ 2022-164720

(51) Int. Cl.
  B62D 25/20   (2006.01)
  B62D 21/03   (2006.01)

(52) U.S. Cl.
  CPC ......... *B62D 25/2027* (2013.01); *B62D 21/03* (2013.01)

(58) Field of Classification Search
  CPC ........ B62D 21/03; B62D 25/08; B62D 25/20; B62D 25/2027
  See application file for complete search history.

(56) References Cited

U.S. PATENT DOCUMENTS

| | | | |
|---|---|---|---|
| 2006/0119140 A1* | 6/2006 | Yamazaki | B62D 25/08 296/203.04 |
| 2006/0202519 A1* | 9/2006 | Latimer, III | B62D 25/2027 296/203.04 |
| 2017/0057555 A1* | 3/2017 | Nakanishi | B62D 21/10 |
| 2019/0276095 A1* | 9/2019 | Lam | B62D 29/007 |
| 2020/0207423 A1* | 7/2020 | Saeki | B62D 25/20 |

FOREIGN PATENT DOCUMENTS

| | | | | |
|---|---|---|---|---|
| JP | 2020-50030 A | | 4/2020 | |
| KR | 19980012344 U | * | 5/1998 | ............. B60N 2/005 |

OTHER PUBLICATIONS

KR 19980012344 U with English translation (Year: 1998).*

* cited by examiner

*Primary Examiner* — Lori Lyjak
(74) *Attorney, Agent, or Firm* — McGinn IP Law Group, PLLC

(57) ABSTRACT

A rear vehicle body structure of a vehicle includes: a rear floor panel provided below a rear seat; a rear cross member to which a rear edge part of the rear floor panel is coupled; a tunnel-shaped raised part that is provided by bending the rear floor panel at a center region in a vehicle width direction of the vehicle, and extends in a forward-rearward direction of a vehicle's body; and a flange that is provided by bending the rear cross member at a center region in the vehicle width direction, and protrudes toward a forward side of the vehicle body from a front wall of the rear cross member. The rear edge part of the rear floor panel is coupled to the rear cross member, in a state where left and right side walls on a rear end side of the raised part are abutted on the flange.

4 Claims, 5 Drawing Sheets

REAR VEHICLE BODY STRUCTURE OF VEHICLE

CROSS-REFERENCE TO RELATED APPLICATIONS

The present application claims priority from Japanese Patent Application No. 2022-164720 filed on Oct. 13, 2022, the entire contents of which are hereby incorporated by reference.

BACKGROUND

The disclosure relates to a rear vehicle body structure of a vehicle, below a rear seat.

Generally, a vehicle such as an automobile includes a rear floor panel below a rear seat. The rear floor panel has left and right edge parts coupled to rear side frames, extending in a forward-rearward direction of a vehicle body, and the like. The rear floor panel has forward and rearward edge parts coupled to a cross member extending in a vehicle width direction.

Generally, such a rear floor panel is formed by a thin plate having a wide planer part. Thus, the rear floor panel has a low rigidity that is likely to lead to production of vibration and noise. To address this, for example, Japanese Unexamined Patent Application Publication (JP-A) No. 2020-50030 discloses a rear vehicle body structure of a vehicle, including: a pair of rear frames extending in a vehicle forward-rearward direction; a rear cross member extending in a vehicle width direction and having both end parts joined to the pair of respective rear frames; a cross member provided on the forward side of the rear cross member; a reinforcement member extending in the vehicle forward-rearward direction and coupling the rear cross member and the cross member to each other; and a floor panel that forms a closed cross section extending in the vehicle forward-rearward direction, together with the reinforcement member.

SUMMARY

An aspect of the disclosure provides a rear vehicle body structure of a vehicle. The rear vehicle body structure includes a rear floor panel, a rear cross member, a tunnel-shaped raised part, and a flange. The rear floor panel is provided below a rear seat. A rear edge part of the rear floor panel is coupled to the rear cross member. The tunnel-shaped raised part is provided by bending the rear floor panel at a center region in a vehicle width direction of the vehicle, and extends in a forward-rearward direction of a vehicle body of the vehicle. The flange that is provided by bending the rear cross member at a center region in the vehicle width direction, and protrudes toward a forward side of the vehicle body from a front wall of the rear cross member. The rear edge part of the rear floor panel is coupled to the rear cross member, in a state where left and right side walls on a rear end side of the raised part are abutted on the flange.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The technique disclosed in JP-A 2020-50030 described above employs a structure in which the reinforcement member is added to couple the rear cross member and the cross member to each other. Thus, the technique disclosed in JP-A 2020-50030 involves an increase in the number of parts, and thus may lead to a complex structure.

The technique disclosed in JP-A 2020-50030 described above employs a structure in which the rear cross member and the reinforcement member are coupled to each other, with a flange shaped rear end part of the reinforcement member joined to the front surface of the rear cross member. This leads to a low load transmission efficiency between the rear cross member and the reinforcement member. Thus, it may be difficult to sufficiently improve the rigidity of the vehicle body rear part.

An object of the disclosure is to provide a rear vehicle body structure of a vehicle that can achieve high rigidity of a vehicle body rear part.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
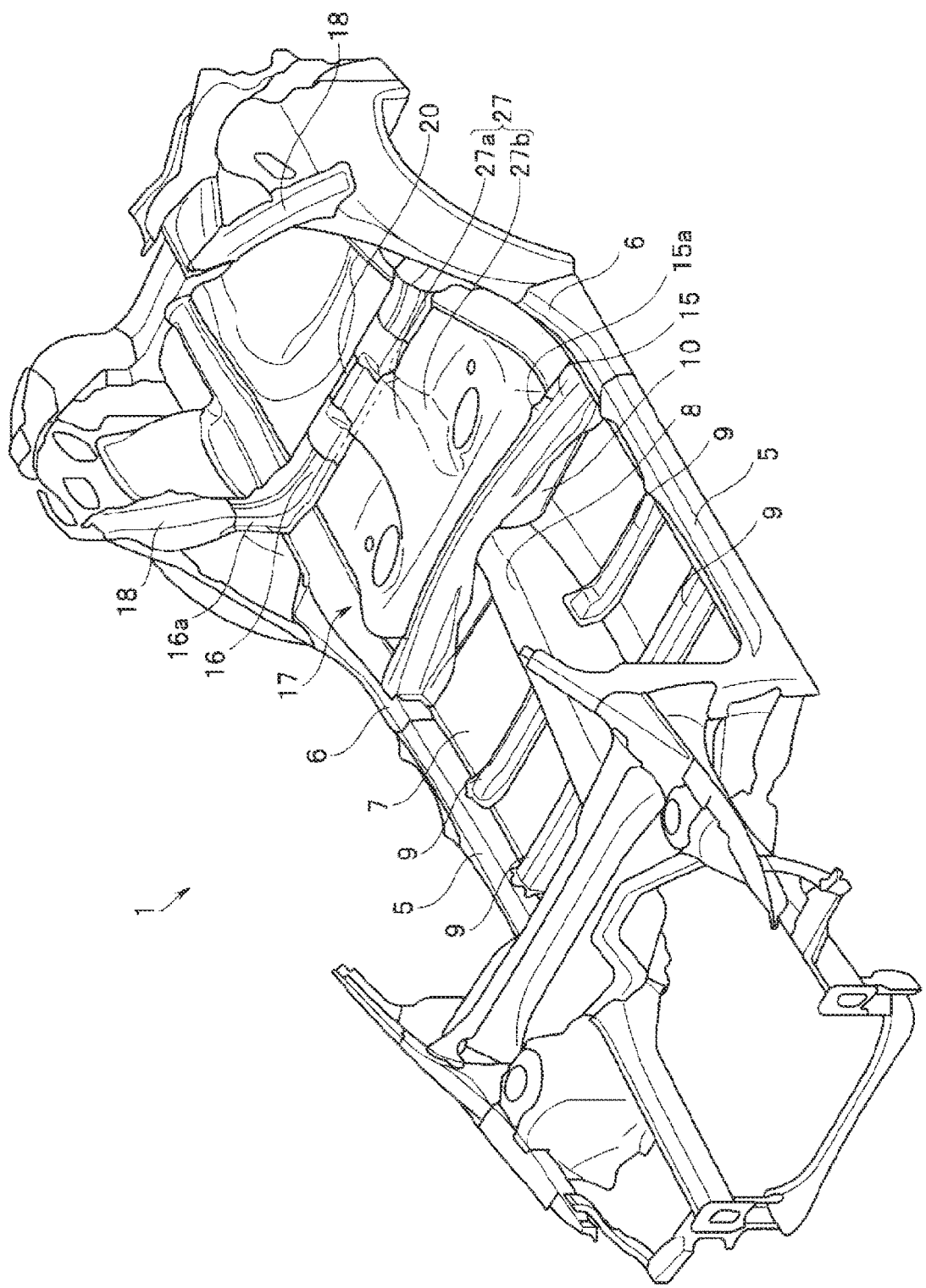
FIG. 1 is a perspective view illustrating a main part of a vehicle body skeleton.

FIG. 1 is a perspective view illustrating a main part of a vehicle body skeleton.

As illustrated in FIG. 1, a vehicle body 1 of a vehicle such as an automobile includes, as a lower part skeleton of the vehicle body 1, a pair of left and right side sills 5 and a pair of left and right rear side frames 6. Parts of the vehicle body 1 in the following description are basically joined to each other by spot welding, arc welding, laser welding, and the like.

The side sills 5 extend in the forward-rearward direction of the vehicle body 1, respectively at left and right side parts of the vehicle body 1. A floor panel 7 forming a floor surface of a vehicle cabin is coupled between the left and right side sills 5. A floor tunnel 8 is provided at the center of the floor panel 7 in the vehicle width direction.

A pair of forward and rearward cross members 9 is provided between each of the left and right side sills 5 and the floor tunnel 8. Each of the cross members 9 extends in the vehicle width direction. The cross members 9 each have left and right end parts each coupled to the side sill 5 or a side wall of the floor tunnel 8. The cross members 9 each have a lower part coupled to the upper surface of the floor panel 7. At left and right side parts of the floor tunnel 8, front seats (none of which is illustrated) are attached to the respective pairs of forward and rear cross members 9, via seat rails.

Figure 2:
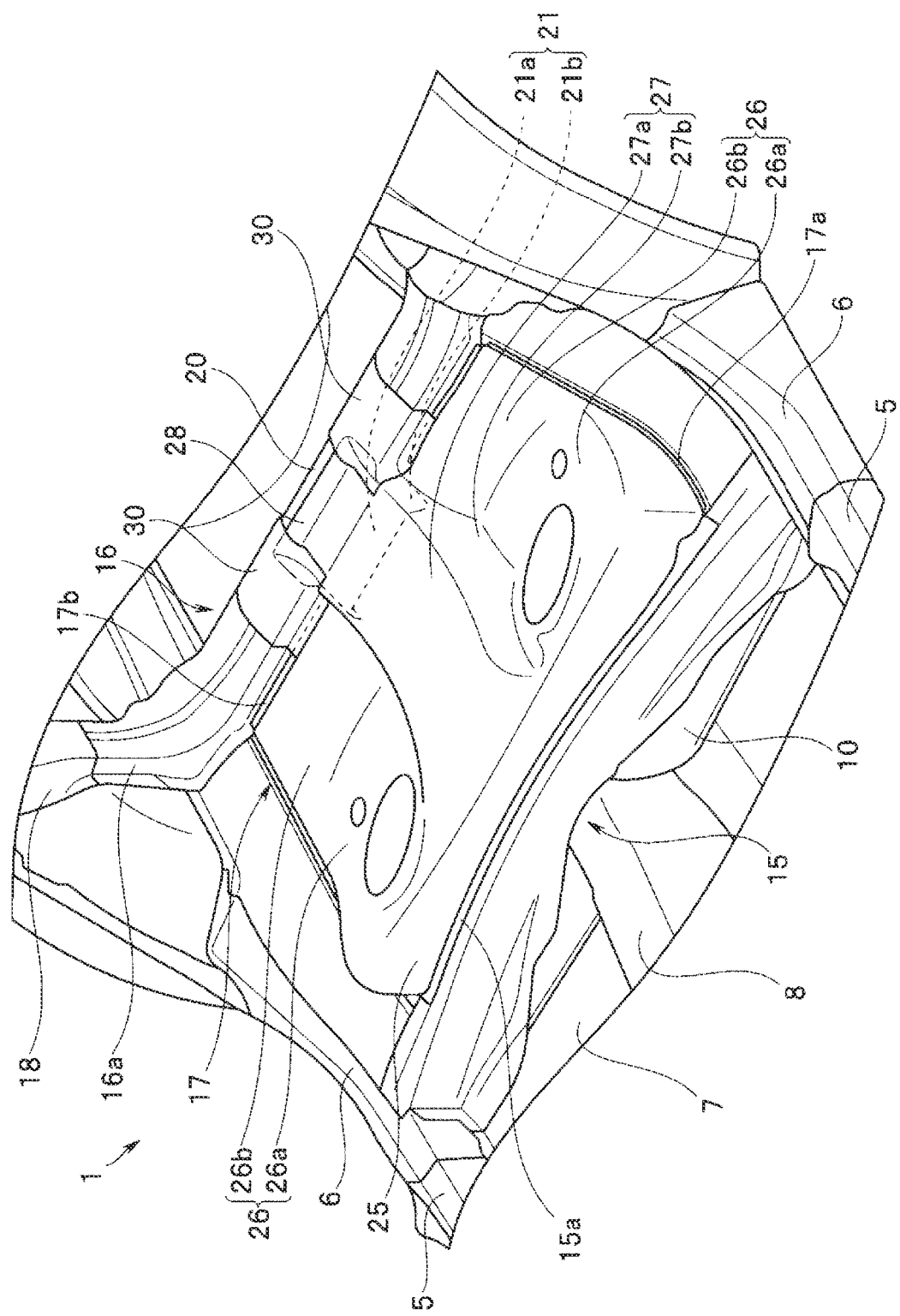
FIG. 2 is an enlarged perspective view illustrating a rear part of the vehicle body skeleton.

As illustrated in FIGS. 1 and 2, the left and right rear side frames 6 extend in the forward-rearward direction of the vehicle body 1, at the left and right side parts of the vehicle body 1. The front ends of the rear side frames 6 are respectively coupled to the rear end parts of the left and right side sills 5.

A rear front cross member 15, a rear cross member 16, and a rear floor panel 17 are provided between the left and right rear side frames 6.

The rear front cross member 15 extends in the vehicle width direction in the vicinity of the front end parts of the left and right rear side frames 6. The rear front cross member 15 has left and right end parts coupled to side walls and upper walls of the left and right rear side frames 6, respectively. The rear front cross member 15 has a lower part coupled to the rear end part of the floor panel 7 via a wall part 10.

The rear front cross member 15 has an upper part provided with a flange 15a extending in the vehicle width direction (see FIG. 2). The flange 15a is formed to be bent and protrude upward from the rear front cross member 15. This enables the front end part of the rear floor panel 17 described below to be coupled to the flange 15a.

The rear cross member 16 is disposed more on the rearward side than the rear front cross member 15 and extends in the vehicle width direction. The rear cross member 16 has left and right end parts coupled to side walls and upper walls of the left and right rear side frames 6, respectively.

In the embodiment, inner panels 16a, forming parts of C-pillars 18, are integrally formed with the left and right end parts of the rear cross member 16. The inner panels 16a extend upward from the upper surface of the rear side frames 6.

Figure 3:
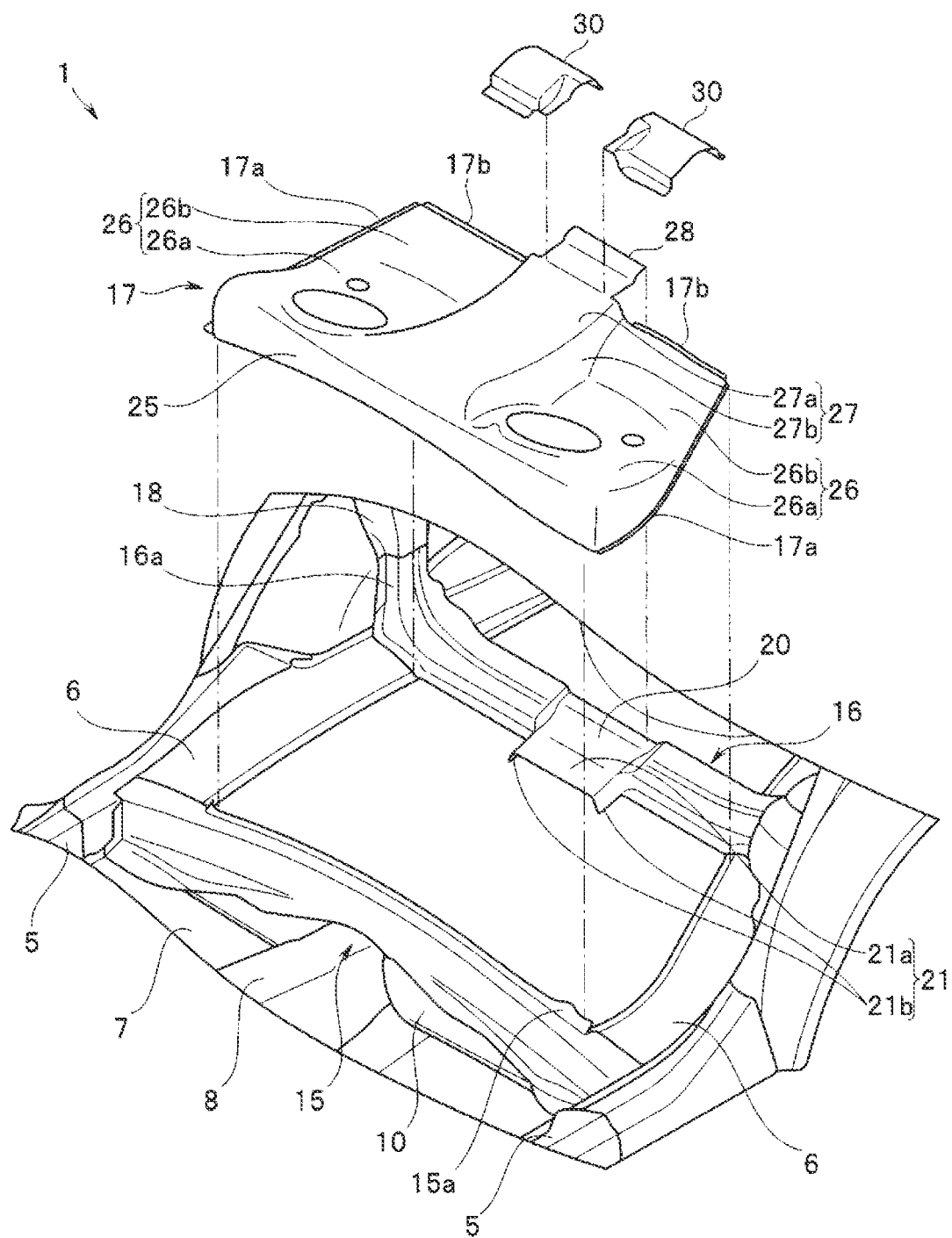
FIG. 3 is an exploded perspective view illustrating the rear part of the vehicle body with the rear floor panel removed.

As illustrated in FIG. 3, a recess part 20 is formed in the upper wall of the rear cross member 16. The recess part 20 is formed at a center region of the rear cross member 16 in the vehicle width direction. As a result, the upper surface of the center region of the rear cross member 16 is set to be lower than other regions of the rear cross member 16.

Figure 5:
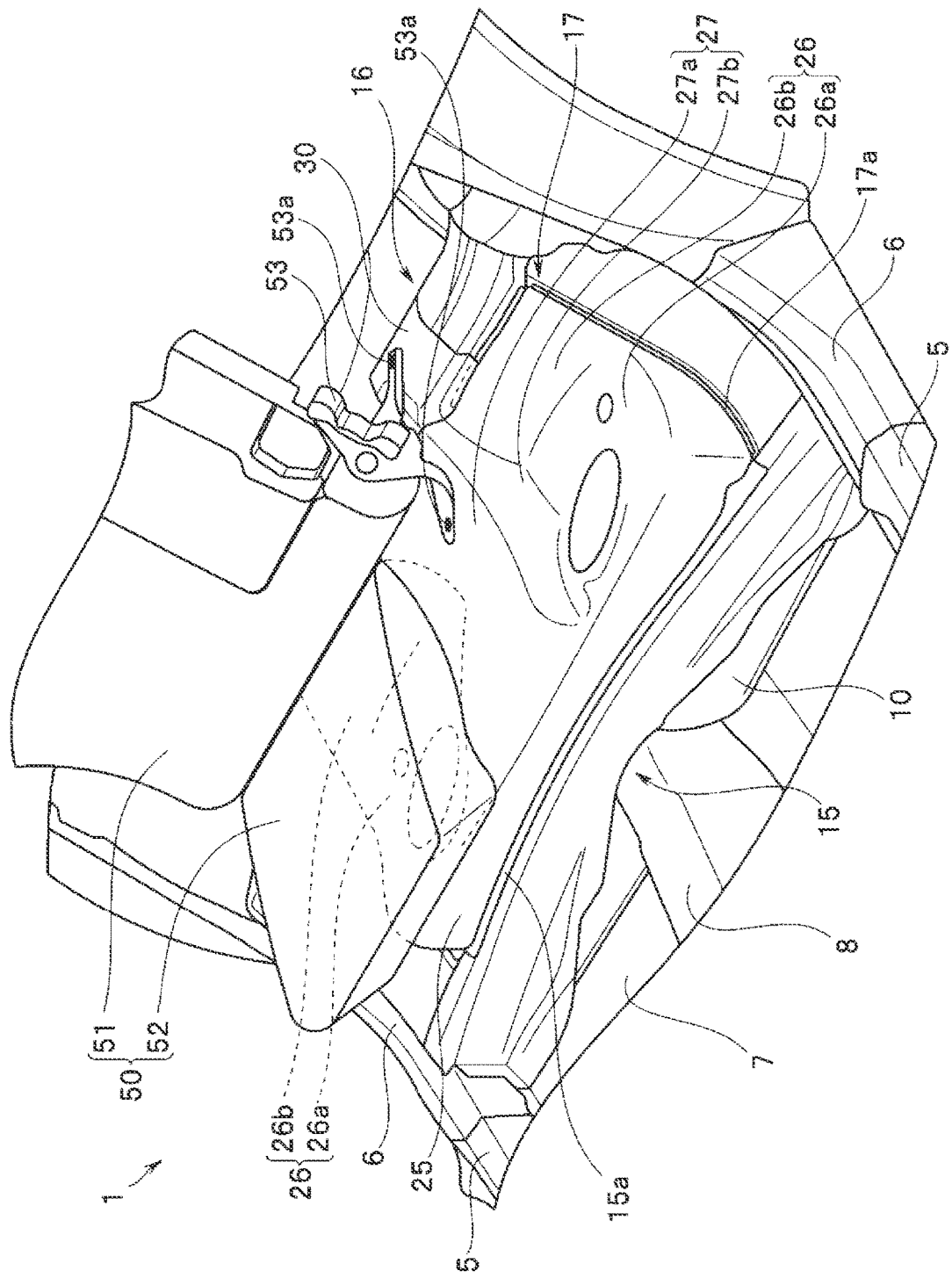
FIG. 5 is a perspective view illustrating the rear floor panel and part of a rear seat.

The width of the recess part 20 in the vehicle width direction is set to be about 20% of the width of a rear seat 50 for example. With this configuration, for example, the recess part 20 is formed in a region not overlapping the seating range of each passenger in the vehicle width direction, when two passengers are seated on the rear seat 50. For example, as illustrated in FIG. 5, when a seat back 51 of the rear seat 50 is divided in a ratio of 6:4, the position of the boundary of the seat back 51 substantially matches one of the left and right boundaries of the recess part 20.

A flange 21 is formed in the center region of the rear cross member 16 in the vehicle width direction. The flange 21 protrudes toward the forward side of the vehicle body 1 from the front wall of the rear cross member 16.

In one example, the flange 21 includes an upper flange 21a and a pair of left and right side flanges 21b. The flange 21 is formed by bending the front wall of the rear cross member 16 for example.

The upper flange 21a is formed to have the width in the vehicle width direction substantially matching the width of the recess part 20 for example. The upper flange 21a protrudes toward the forward side of the vehicle body 1, at the height that is substantially the same as the bottom surface of the recess part 20 for example.

The left and right side flanges 21b are integrally formed with the upper flange 21a for example. The side flanges 21b are formed to be bent and extend downward from the left and right side edge parts of the upper flange 21a, respectively.

The rear floor panel 17 is formed by a thin steel plate having a predetermined thickness for example. The rear floor panel 17 forms a floor surface for holding a seat cushion 52 of the rear seat 50 (see FIG. 5).

A vertical wall part 25 extending in the upward-downward direction is formed over a front part and side regions close to the front part of the rear floor panel 17. With this vertical wall part 25, the upper surface of the rear floor panel 17 on the front part side protrudes upward.

The rear floor panel 17 is provided with a first inclined part 26a and a second inclined part 26b. The first inclined part 26a is mildly inclined downward from a front part to an intermediate part of the rear floor panel 17. The second inclined part 26b is disposed more on the rearward side than the first inclined part 26a, and is inclined upward from the intermediate part to the rear end part of the rear floor panel 17. With the first and the second inclined parts 26a and 26b, a cushion accommodating part 26 having a recess parted shape is formed in the rear floor panel 17. The cushion accommodating part 26 can accommodate the seat cushion 52 of the rear seat 50.

The center region of the rear floor panel 17 in the vehicle width direction is provided with a raised part 27. The raised part 27 includes an upper wall 27a and left and right side walls 27b. The upper wall 27a and the side walls 27b are formed by bending the rear floor panel 17. The raised part 27 extends in the forward-rearward direction of the vehicle body 1. Thus, the raised part 27 partitions the cushion accommodating part 26 into left and right sections.

The upper wall 27a of the raised part 27 extends from the rear end to the front part of the rear floor panel 17. The upper wall 27a has a substantially uniform width from the rear end to the front part. The width of the upper wall 27a is set to be substantially the same as the width of the upper flange 21a of the rear cross member 16.

The upper wall 27a has a base end part set to be at a position overlapping the upper surface of the upper flange 21a, when the rear floor panel 17 is attached to the rear cross member 16.

The upper surface of the upper wall 27a is formed to be curved, and thus is a recessed curved surface curved downward along the forward-rearward direction of the vehicle body 1. With the upper wall 27a thus curved, the raised part 27 has a substantially saddle shape. With the upper wall 27a thus curved, the upper surface of the raised part 27 has the rear end side set to be lower than the front end side.

The base end part of the upper wall 27a is provided with a protruding plate 28 protruding toward the rearward side of the vehicle body 1. The protruding plate 28 is formed by a plate-shaped member integrally formed with the rear floor panel 17. The protruding plate 28 is set to be at a position overlapping the bottom surface of the recess part 20 of the rear cross member 16, when the rear floor panel 17 is attached to the rear cross member 16.

The left and right side walls 27b are each integrally formed with the upper wall 27a. The side walls 27b are formed to be bent and extend downward from the left and right side edge parts of the upper wall 27a, respectively. The base end parts of the side walls 27b are set to be at positions overlapping (abutting) of outer side surfaces of the respective side flanges 21b, when the rear floor panel 17 is attached to the rear cross member 16.

As illustrated in FIG. 3, both edge parts of the rear floor panel 17 on the left and right sides are provided with flanges 17a for coupling the rear floor panel 17 to the rear side frames 6. Rear edge parts of the rear floor panel 17 excluding the raised part 27 are provided with flanges 17b for coupling the rear floor panel 17 to the rear cross member 16.

The rear floor panel 17 with such a configuration is attached to the left and right rear side frames 6, the rear front cross member 15, and the rear cross member 16.

The vertical wall part 25 of the rear floor panel 17 is welded to the flange 15a of the rear front cross member 15 for example. Thus, the front part of the rear floor panel 17 is attached to the rear front cross member 15.

The flanges 17a at both edge parts of the rear floor panel 17 on the left and right sides are respectively welded to the left and right rear side frames 6. With this configuration, the left and right side edge parts of the rear floor panel 17 are respectively attached to the left and right rear side frames 6.

The flanges 17b at the rear edge parts of the rear floor panel 17 are welded to the rear cross member 16. The rear end part of the raised part 27 of the rear floor panel 17 is welded to the flange 21 of the rear cross member 16. The protruding plate 28 of the rear floor panel 17 is welded to the recess part 20 of the rear cross member 16. With these configurations, the rear edge part of the rear floor panel 17 is attached to the rear cross member 16.

When the raised part 27 is welded to the flange 21, the rear end parts of the side walls 27b abut on the respective side flanges 21b of the rear cross member 16.

When the protruding plate 28 is welded to the recess part 20, the rear cross member 16 and the protruding plate 28 are partially covered by a pair of left and right reinforcement plates 30. The reinforcement plates 30 are welded to the rear cross member 16 at and around the recess part 20. With this configuration, the protruding plate 28 is at least partially welded to the recess part 20 together with the reinforcement plates 30.

For example, a fuel tank (not illustrated) is disposed at a lower part of the rear floor panel 17 thus attached to the vehicle body 1.

According to such an embodiment, the vehicle body 1 includes the tunnel-shaped raised part 27 that is formed by bending the rear floor panel 17 at the center region in the vehicle width direction and extends in the forward-rearward direction of the vehicle body 1; and the flange 21 that is formed by bending the rear cross member 16 at the center region in the vehicle width direction of the vehicle body 1, and protrudes toward the forward side of the vehicle body 1 from the front wall of the rear cross member 16. The vehicle body 1 has a vehicle body structure in which the rear edge part of the rear floor panel 17 is coupled to the rear cross member 16, in a state where the left and right side walls 27b at the rear end side of the raised part 27 are abutted on the side flanges 21b of the flange 21. Thus, the vehicle body 1 can have a high rigidity at a rear part, with a simple configuration.

In the rear vehicle body structure of a vehicle of the embodiment, the raised part 27 extending in the forward-rearward direction of the vehicle body 1 is formed in the center region of the rear floor panel 17 in the vehicle width direction. With this configuration, a planer part of the rear floor panel 17 formed by a thin plate is divided to left and right sections. Thus, the rear floor panel 17 can be stiffened with a simple structure, without newly adding a stiffening member or the like. For example, the raised part 27 can suppress the vibration in the upward-downward direction at the center of the rear floor panel 17, whereby the rear floor panel 17 can be efficiently stiffened.

The left and right side walls 27b on the rear end side of the raised part 27 are coupled to the side flanges 21b of the flange 21 protruding from the front wall of the rear cross member 16, in an abutting state. Thus, the rear end part of the raised part 27 is rigidly coupled to the rear cross member 16. Thus, with a simple configuration, the rigidity of the raised part 27 can be improved, and the rigidity of the rear floor panel 17 can be improved more effectively.

Figure 4:
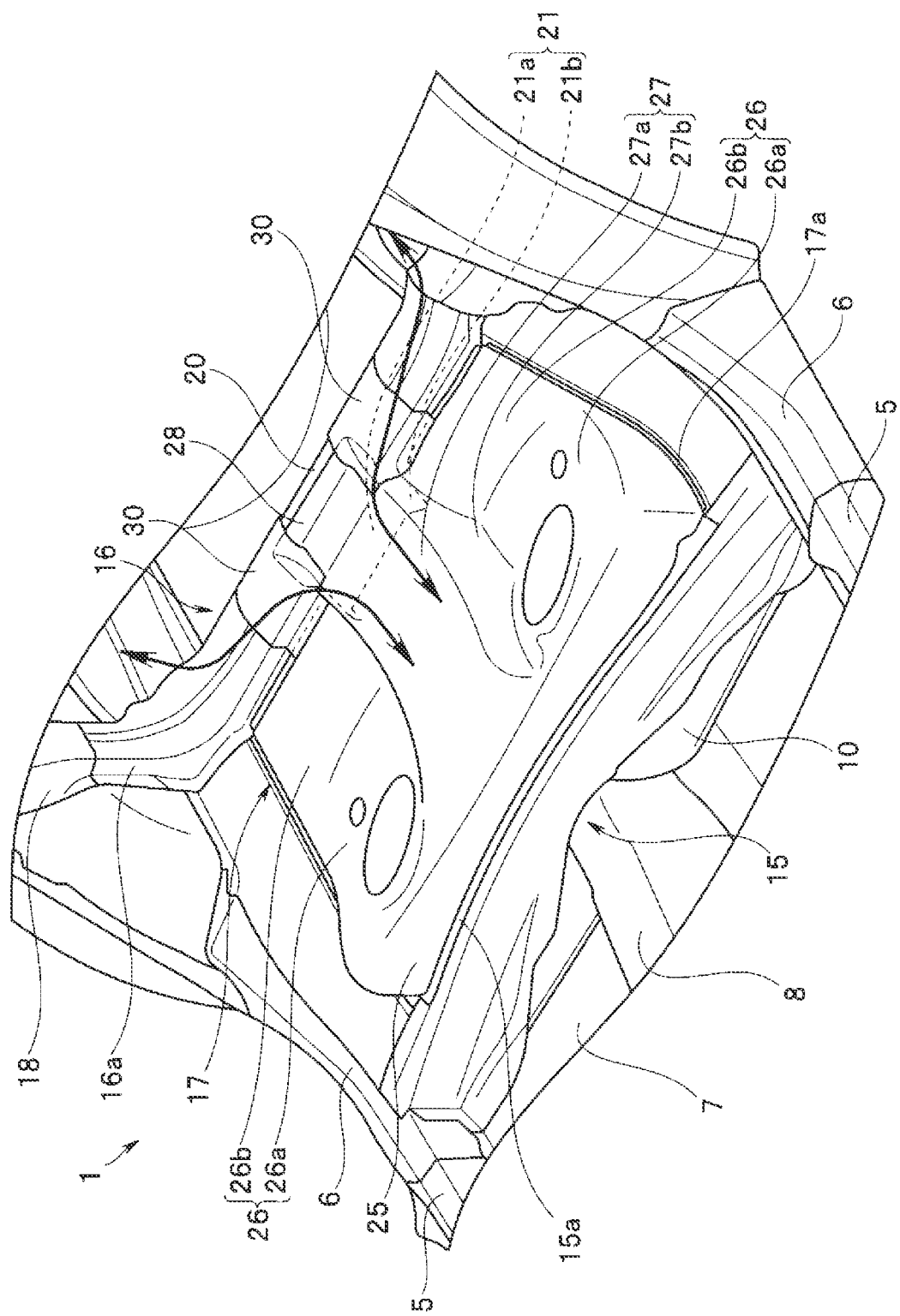
FIG. 4 is a diagram illustrating a load transmission path in the rear part of the vehicle body.

With the raised part 27 coupled to the rear cross member 16 as described above, a load path for an impact load input from the rear side frames 6 and the like can be formed between the rear cross member 16 and the raised part 27 (see FIG. 4). Thus, the deformation of the rear cross member 16 and the like is effectively suppressed, and the rigidity of the rear part of the vehicle body 1 can be effectively improved. For example, with the raised part 27 coupled to the rear cross member 16 with the side walls 27b abutted on the side flanges 21b, an efficient load path can be formed.

With the raised part 27 and the rear cross member 16 coupled in the center region in the vehicle width direction, a hinge 53 for supporting the seat back 51 of the rear seat 50 can be compactly formed. For example, as illustrated in FIG. 5, in the vehicle body structure of the embodiment, attachment points 53a of the hinge 53 can be set to be on the upper surfaces of the raised part 27 and the rear cross member 16. Thus, the attachment points 53a of the hinge 53 can be set to be at substantially the same height, whereby the hinge 53 can be compactly formed compared with a vehicle body structure using the rear floor panel 17 without the raised part 27 formed.

In this case, the upper parts of the raised part 27 and the rear cross member 16 are coupled to each other, with the protruding plate 28 protruding from the rear end of the upper part of the raised part 27 overlapping the recess part 20 formed in the upper wall of the center region of the rear cross member 16 in the vehicle width direction. With this configuration, the coupling strength between the raised part 27 and the rear cross member 16 can be further increased. Thus, the rigidity of the rear part of the vehicle body 1 can be more effectively increased. With various cables such as a power cable and a signal cable routed through the recess part 20, the various cables can be routed without excessively interfering with the rear seat 50.

The raised part 27 has the upper surface formed as a recessed curved surface. Thus, in the center region in the vehicle width direction where the raised part 27 is formed, a space for arranging the seat cushion 52 can be secured in the thickness direction.

The width of the upper wall 27a of the raised part 27 in the vehicle width direction is set to be substantially uniform along the forward-rearward direction of the vehicle body 1. Thus, the raised part 27 can be formed without making the side walls 27b unnecessarily curved. Accordingly, when the impact load or the like is transmitted to the raised part 27, the load can be prevented from concentrating at a certain part of the side walls 27b, whereby the rigidity of the raised part 27 can be further increased.

The disclosure in the embodiments described above is not limited to the embodiments, and may be embodied with various modifications made without departing from the gist of the disclosure. Further, the embodiment includes disclosures at various stages, and the various disclosures can be extracted from the embodiment by appropriately combining plural disclosed elements.

For example, even if some elements are removed from all the elements indicated in the one embodiment, this configuration in which the elements are removed can be extracted as the disclosure as long as the problem described can be solved and the advantageous effects described can be obtained.

The invention claimed is:

1. A rear vehicle body structure of a vehicle, the rear vehicle body structure comprising:
   a rear floor panel provided below a rear seat;
   a rear cross member to which a rear edge part of the rear floor panel is coupled;
   a tunnel-shaped raised part that is provided by bending the rear floor panel at a center region in a vehicle width direction of the vehicle, and extends in a forward-rearward direction of a vehicle body of the vehicle; and
   a flange that is provided by bending the rear cross member at a center region in the vehicle width direction, and protrudes toward a forward side of the vehicle body from a front wall of the rear cross member, wherein
   the rear edge part of the rear floor panel is coupled to the rear cross member, in a state where left and right side walls on a rear end side of the raised part are abutted on the flange.

2. The rear vehicle body structure of the vehicle according to claim 1 further comprising:
   a protruding plate that protrudes toward a rearward side of the vehicle body from a rear end of an upper part of the raised part; and
   a recess part disposed in an upper wall at the center region of the rear cross member in the vehicle width direction, wherein
   the protruding plate is coupled to the recess part in an overlapping manner.

3. The rear vehicle body structure of the vehicle according to claim 1, wherein an upper surface of the raised part is shaped as a recessed curved surface curved along the forward-rearward direction of the vehicle body.

4. The rear vehicle body structure of the vehicle according to claim 1, wherein the raised part has a uniform width along the forward-rearward direction of the vehicle body.

* * * * *